US00RE39217E

(19) United States
(12) Reissued Patent
Rockwood

(10) Patent Number: US RE39,217 E
(45) Date of Reissued Patent: Aug. 1, 2006

(54) CENTRIFUGAL PUMP HAVING OIL MISTING SYSTEM WITH PIVOTING BLADES

(75) Inventor: Robert E. Rockwood, Windham, NH (US)

(73) Assignee: Environamics Corporation, Hudson, NH (US)

(21) Appl. No.: 10/877,972

(22) Filed: Jun. 28, 2004

Related U.S. Patent Documents

Reissue of:
(64) Patent No.: 6,551,055
Issued: Apr. 22, 2003
Appl. No.: 09/927,464
Filed: Aug. 13, 2001

(51) Int. Cl.
*F04D 29/08* (2006.01)

(52) U.S. Cl. ..... 415/111; 415/175; 415/229; 184/11.2; 417/423.13

(58) Field of Classification Search ..... 416/142, 416/87, 88, 2, 204 R, 244 R, 248, 219 R, 416/220 R, 219 A, 220 A; 184/13.1, 6.26, 184/11.2, 55.1, 61; 415/111, 110, 175, 229; 417/423.13
See application file for complete search history.

(56) References Cited

U.S. PATENT DOCUMENTS 3,764,189 A * 10/1973 Prostler et al. ..... 384/278
4,169,603 A * 10/1979 Funk ..... 277/348
4,669,164 A * 6/1987 Phelps ..... 29/889.4
5,647,735 A * 7/1997 Rockwood ..... 417/423.13
5,944,493 A * 8/1999 Albertin et al. ..... 417/273
6,434,943 B1 * 8/2002 Garris ..... 60/649
6,460,656 B1 * 10/2002 Jones et al. ..... 184/13.1

* cited by examiner

*Primary Examiner*—Edward K. Look
*Assistant Examiner*—Richard A. Edgar
(74) *Attorney, Agent, or Firm*—Berenato, White & Stavish LLC

(57) ABSTRACT

A lubrication system for equipment (e.g. centrifugal pump) [employing a rotating shaft and corresponding support bearings is disclosed. The lubrication system] includes a lubricant dispenser having a plurality of blades or dispensing members pivotally attached thereto, the dispenser affixed to the shaft for rotation therewith. Centrifugal force created by rotation of the shaft to which the dispensing blades are attached causes the blades to extend radially outward from the shaft center during operation so as to dispense the lubricant throughout a lubricating or misting chamber in order to lubricate the adjacent bearings. The system is also advantageous in that the blades are permitted to pivot or flap downward toward the shaft in either direction so that the dispenser may be more easily inserted into the misting chamber during manufacturing of the device or replacement of the lubricating system. [In such a manner, a lubricant dispenser is provided that has an operating outer diameter that slices cleanly through the lubricating fluid to avoid excessive splashing and spraying of the fluid. This also allows the lubricant fluid level in the misting chamber to be lowered if desired so as to reduce heat generation during operation without overly splashing or spraying lubricant.]

19 Claims, 6 Drawing Sheets

CENTRIFUGAL PUMP HAVING OIL MISTING SYSTEM WITH PIVOTING BLADES

Matter enclosed in heavy brackets [ ] appears in the original patent but forms no part of this reissue specification; matter printed in italics indicates the additions made by reissue.

This invention relates to a lubrication system for a device, such as a centrifugal chemical processing pump, employing a rotating shaft with corresponding shaft supporting bearings. More particularly, this invention relates to a lubrication system for lubricating shaft supporting bearings, the system including a lubricant dispenser affixed to the shaft for rotation therewith and wherein the dispenser includes a plurality of pivotally mounted members for dispensing lubricant toward the bearings.

This application is related to U.S. Pat. No. 5,647,735, issued Jul. 15, 1997, the disclosures of which is hereby incorporated herein by reference.

BACKGROUND OF THE INVENTION

Environmentally hazardous fluids, such as acids, oils, and toxins, often need to be pumped throughout fluid flow systems form one location to another. Centrifugal chemical processing pumps including a motor driven impeller affixed to a pump shaft are typically utilized in pumping such fluids. See, for example, U.S. Pat. No. 5,411,366, the disclosure of which is hereby incorporated herein by reference.

The shafts of such pumps are typically rotatably supported against radial movement and vibration by conventional pump shaft bearings (e.g. ball bearings). These bearings must be continually lubricated throughout the operation of the pump in order to reduce maintenance requirements and maintain a satisfactory operating life of the bearings and thus the pump.

Conventional lubricating fluid, such as oil, is typically used to lubricate such pump shaft bearings. Conventional chemical processing pumps typically include ball bearings for supporting the pump shaft, the bearings being disposed within a misting or lubrication chamber. In the prior art, these shaft supporting ball bearings are typically lubricated by positioning the oil level within the lubrication chamber at a level or position about half-way up the bottom ball of the bearing. Maintaining the lubricating oil at such a position necessarily means that when the shaft and supporting bearings are rotated, the bearings must continuously plow through the lubricating oil in which they are partially submerged. This results in undesirable heat generation within the bearings and adjacent to pump shaft, such heat being caused by the friction created by the bearings continually passing through the lubricating oil. Such heat generation increases maintenance requirements and reduces the operating life of the bearings.

If the oil level could be lowered, less heat would be generated. However, a lower oil level requires a dispenser having a larger outer diameter. Next is the issue of how to get the bearing lubrication system (including a large rotating dispenser) into the misting or lubricating chamber adjacent the bearings. Typically, it is desirable to slide the lubricant dispenser into the misting chamber along with the shaft and bearings through a hole or bore in the body of the pump. Thus, in the past, the size (i.e. outer diameter) of the lubricant dispenser, which could be inserted into the misting chamber in such a manner, has been limited by the diameter of the hole or bore in the pump. In other words, one could not insert a lubricant dispenser into the misting chamber if the outer diameter of the dispenser was greater that the interior diameter of the bore existing in the pump body.

Conventional systems also fail to efficiently and effectively distribute oil through centrifugally-operated rotating equipment because such systems create unwanted splashing and spraying of excessive lubricant into or away from the bearings that require lubrication.

It is apparent from the above that there exists a need in the art for a lubricant dispenser, which may be inserted into rotating equipment (e.g. chemical processing pump) wherein the outer diameter of the lubricant dispenser during operation is greater than the inner diameter of the space in the pump through which the dispenser must be inserted. It is also a purpose of this invention to provide a lubrication system wherein the fluid is maintained at a level below the bearings disposed in the chamber so as to reduce or eliminate heat generation caused by the bearings plowing through and being submerged in a lubricating fluid. The lower lubricant level necessitates a larger dispenser according to certain embodiments.

It is the purpose of this invention to fulfill the above-described needs in the art, as well as other needs apparent to the skilled artisan from the following detailed description of this invention.

SUMMARY OF THE INVENTION

It is the object of this invention to provide a lubricant dispenser, which may be inserted into rotating equipment (e.g. chemical processing pump) wherein the outer diameter of the lubricant dispenser during operation is greater than the inner diameter of the space in the pump body through which the dispenser must be inserted.

It is also an object of this invention to provide a lubrication system wherein the fluid is maintained at a level below the bearings disposed in the chamber so as to reduce heat generation caused by the bearings rotating through and being submerged in a lubricating fluid.

It is also an object of this invention to provide a lubrication system that reduces a splashing effect of the lubrication dispenser when the dispenser members contact the lubricant.

Generally speaking, this invention fulfills the above-described needs in the art by providing a centrifugal pump for pumping a liquid to be pumped, the pump comprising:

- a pump housing;
- a rotatable shaft disposed at least partially within said housing;
- a lubrication chamber surrounding the shaft, the chamber for housing a lubricating fluid;
- shaft supporting bearings disposed in or adjacent the lubrication chamber, the bearings to be lubricated by the lubricating fluid;
- a dispenser including a base support member and a plurality of collapsible dispensing members pivotally attached thereto, the dispenser being attached to the shaft for rotation therewith and for dispensing the lubricating fluid in the chamber in order to lubricate the bearings; and
- wherein the collapsible dispensing members designed with a profiled oil-engaging edge that reduces splashing or spraying of the oil.

According to another aspect of the invention, the pivoting mechanism related to the collapsible dispensing members has been improved to increase strength and reduce frictional resistance, thereby increasing the operating life of the bearings and oil dispensing system associated therewith.

According to a further aspect of the invention, the dispensing blades are formed with a selective height chosen according to the particular pump system to which the dispenser is attached.

Each aspect of the invention provides a dispensing system that improves distribution of lubrication and increases the operating life of the dispenser and bearings.

This invention will now be described with respect to certain embodiments thereof, accompanied by certain illustrations that follow.

DETAILED DESCRIPTION OF EMBODIMENTS OF THIS INVENTION

Figure 1:
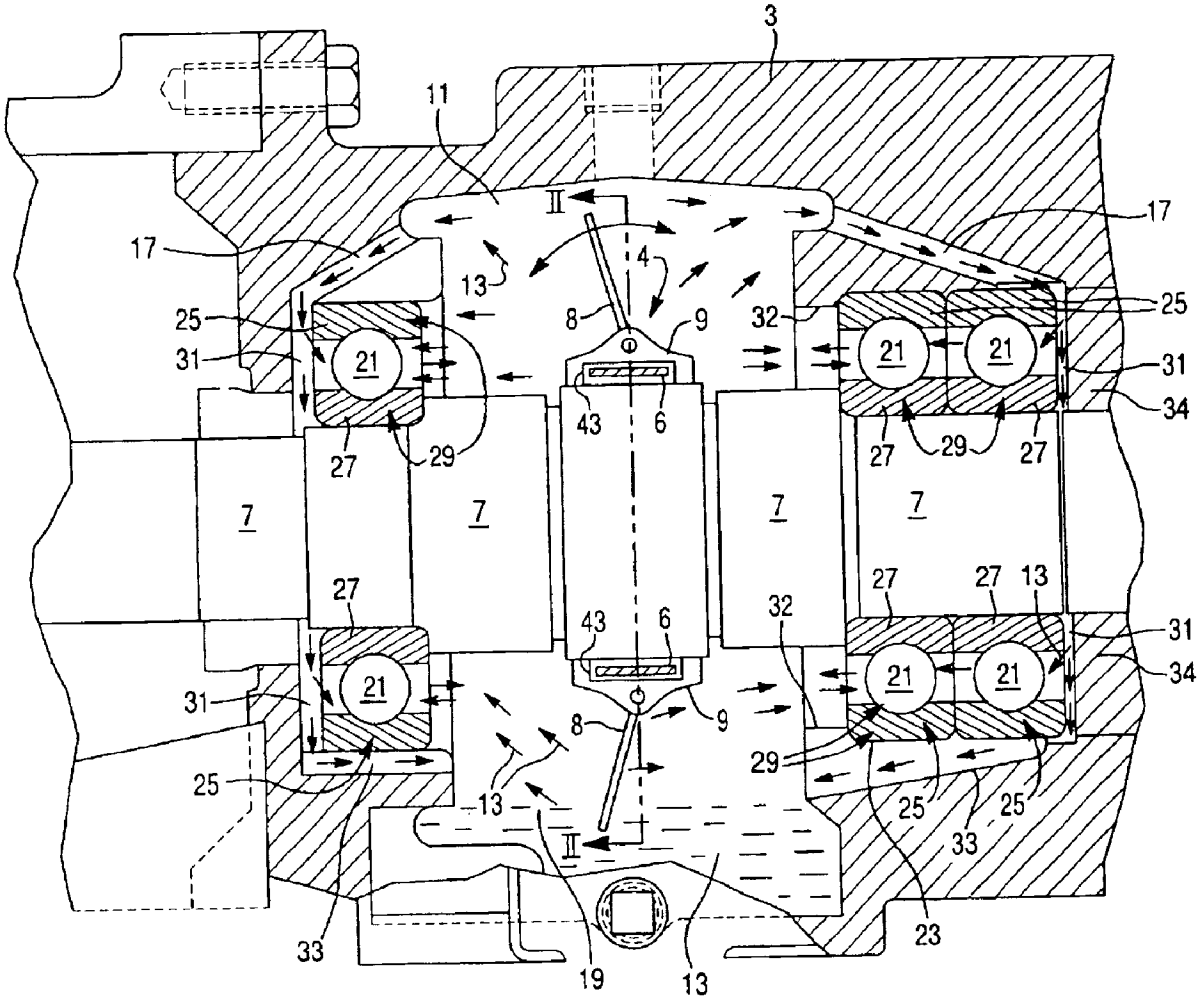
FIG. 1 is a side cross-sectional view of the oil misting chamber of a centrifugal chemical processing pump according to one embodiment of this invention, this misting chamber being disposed within a surrounding centrifugal pump with the dispensing blades slightly angled from their actual operating positions where they extend radially away from the center of the pump shaft.

Referring now more particularly to the accompanying drawings in which like reference numerals indicate like parts throughout the several views.

Below described is a lubrication system according to certain embodiments of this invention used in conjunction with a chemical processing centrifugal pump having a centrally located rotating shaft. However, it will be understood by those skilled in the art that the lubrication system according to certain embodiments of this invention may be used in conjunction with other rotating equipment, which utilize a lubricant sump for the purpose of lubricating supporting shaft bearings.

FIG. 1 is a side elevational partial cross-sectional view of the lubrication system of a centrifugal environmentally sealed chemical processing pump according to a particular embodiment of this invention. Illustrated in FIG. 1 is surrounding pump housing 3, in which misting or lubricating chamber 11 is defined. The centrifugal pump includes central rotating shaft 7 disposed between the pump motor and pump impeller. The fluid to be pumped is actually pumped by the impeller (not shown), which in turn is driven by the motor (not shown) via elongated shaft 7.

The misting or lubricating system illustrated in FIG. 1 includes dispenser 4 made up of supporting band 6 to which a plurality of lubricant dispensing members or blades 8 are attached through a vane holder 9. Blades 8 are collapsible in that they are pivotally attached to vane holder 9 so that they may pivot or flop (i.e. collapse) downward during both (i) insertion of the dispenser 4 into misting chamber 11 through bore 32; and (ii) during non-use of the pump when shaft 7 is not moving. In other words, blades 8 are collapsible by way of their mounting arrangement so as to allow the dispenser 4 to pass through the annular bore 32 that the bearing fits through during installation. The pitch of blades 8 can be altered from a flat pitch or angularity to a heavy pitch in order to produce different misting effects.

For example, when the annular bore 32 through which the dispenser 4 is to be inserted is defined by the inner or interior diameter of a hole in the pump frame 3 (on either side of chamber 11), the diameter of dispenser 4 when members 8 are collapsed is less than the diameter of the bore. Thus, the dispenser with collapsed blades 8 may be inserted through the bore and into misting chamber 11. However, once in chamber 11, during pump operation when shaft 7 is rotated, blades 8 "stand up" so that the operating outer diameter of dispenser 4 is greater than the diameter of the bore 32 (and greater than the inner diameter of bearing frame(s) 3, and greater than the diameter defined by the radius at which bearing balls 21 roll in their raceways). The operating diameter of dispenser 4 is of course defined by the diameter around the outer periphery of blades 8 as they rotate within chamber 11.

When the pump shaft 7 is driven by the pump motor, supporting band 6 and blades 8 affixed thereto rotate along with shaft 7 within annular lubricating chamber 11 thereby dispensing lubricating fluid (e.g. oil) throughout chamber 11 as shown in FIG. 1. When shaft 7 is rotated, the blades 8 are caused to extend radially away from shaft 7 (i.e. stand up) due to the centrifugal force created by the shaft 7 rotation. Thus, during rotation of shaft 7 when the pump is pumping, the outer diameter of the dispenser (defined by the outer diameter of blades 8) is greater than the inner diameter of the stationary hole or bore through which it was inserted.

Dispensing members or blades 8 dip into the lubricating fluid 13 below fluid level 19 when shaft 7 is rotated thereby dispensing or flinging the lubricant 13 throughout chamber 11 so that the lubricant makes its way into auxiliary passageways 17 and therefrom down into auxiliary chambers 31. It is noted that the passageways 17, while shown in this exemplary embodiment, are not a necessary feature of the instant invention.

As shown in FIG. 1, the lubricating fluid level 19 within chamber 11 is, according to certain embodiments of this invention, maintained at a level below both bearing rollers 21 and the outer diameter 23 of stationary outer bearing frames (i.e. outer races) 25. This lower lubricant level 19 requires a dispenser 4 with a larger working outer diameter than would otherwise be necessary so that the members 8 can reach into the lubricant below level 19.

Outer bearing frame portions or outer races 25 work in conjunction with inner bearing frame portions (i.e. inner races) 27 (affixed to shaft 7) so as to define roller raceways therebetween in which bearing rollers 21 move during shaft 7 rotation. Together, bearing rollers 21 in combination with bearing races 25 and 27 make up the bearings 29 of the centrifugal pump which are provided for the purpose of supporting shaft 7 during rotation thereof.

When the lubricant 13 is dispensed throughout chamber 11 by blades 8, the lubricant makes it way down auxiliary passageways 17 into chambers 31 on both sides of chamber 11. Once in auxiliary chambers 31, the lubricant is permitted to lubricate the bearing raceways, frames, and balls on all sides thereby improving performance. From auxiliary chambers 31, some of the lubricating fluid makes its way back into main chamber 11 through the gap between bearing races or frames 25 and 27. However, some of the lubricant from annular auxiliary chambers 31 makes its way back into main chamber 11 by way of passageways 33 disposed below outer bearing frames 25. Auxiliary passageways 17, auxiliary chambers 31, and passageways 33 are designed so that the lubricating fluid, once in passageway 17, makes its way through chambers 31 and passageways 33 due to the force gravity and back into main misting chamber 11.

Main chamber 11 may, according to certain embodiments, be provided with an outlet and inlet (not shown) in communication with an external lubricant reservoir. These are provided so that the lubricating fluid (e.g. oil) from chamber 11 may be circulated out of the pump, cooled and filtered in the external reservoir, and thereafter recirculated back into chamber 11 by way of the inlet (not shown).

Figure 2:
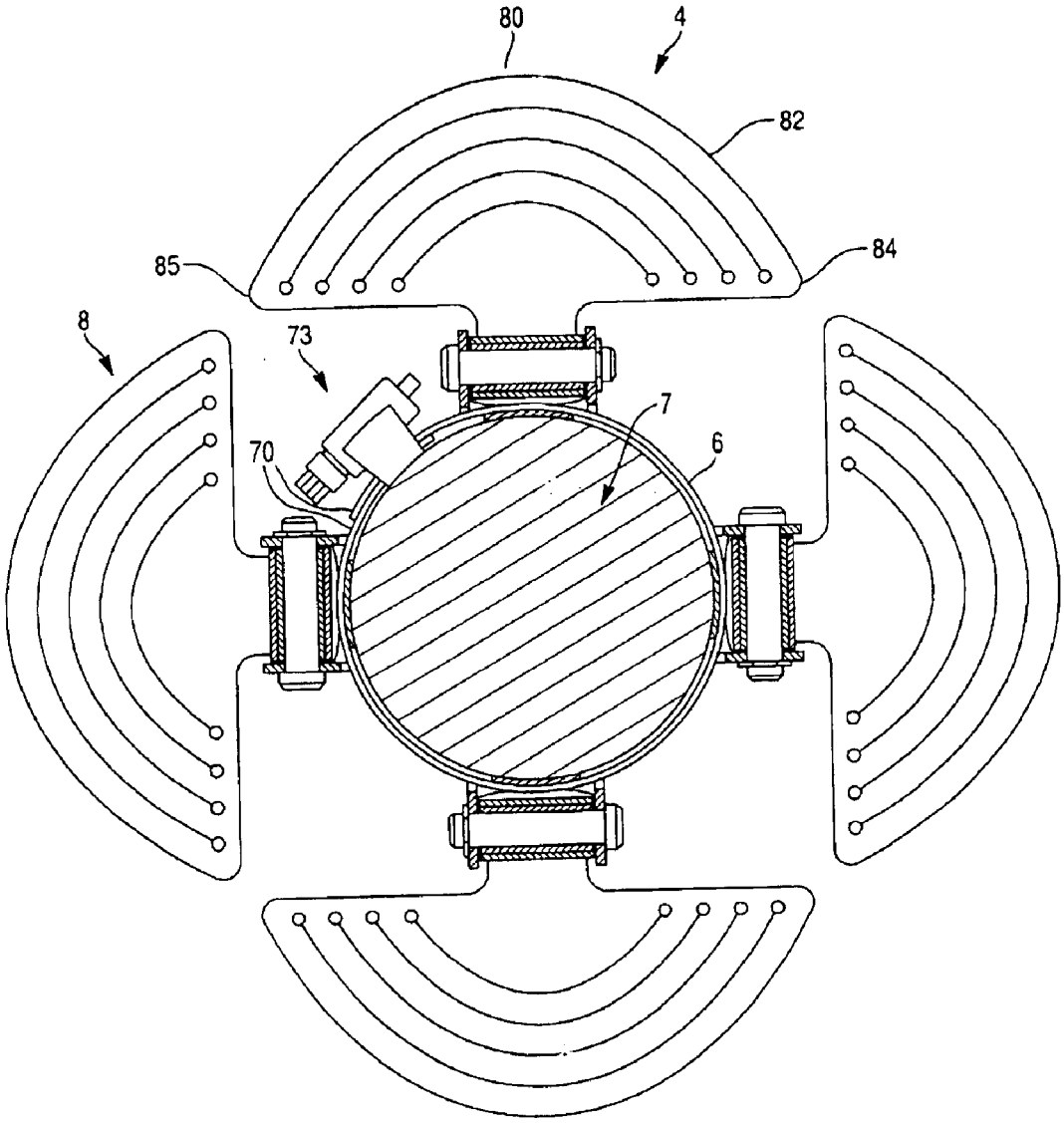
FIG. 2 is an end view (illustrating the shaft cross-sectionally) showing the FIG. 1 lubricant dispenser attached to the shaft.

FIG. 2 is an end view illustrating the lubricant dispenser 4 of FIG. 1. In FIG. 2, pump shaft 7, supporting band 6 and vane holder 9 and is illustrated cross-sectionally, while the blade 8 is illustrated in an elevational manner. As shown, a plurality of dispensing members or blades 8 are attached to shaft 7 for rotation therewith by way of base support band 6. Support band 6 is wrapped around and affixed to pump shaft 7 for rotation therewith. Support band 6 mounts a plurality of vane holders 9 extending radially outward therefrom. Vane holders 9 are provided for pivotally mounting the dispensing blades 8. Each holder 9 includes a mounting base 9a through which the support band 6 passes and a pair of support legs 9b having an aperture defined therein for the purpose of receiving elongated support shaft or dowel 10 (see FIGS. 3A and 3B).

Figures 3A, 3B:
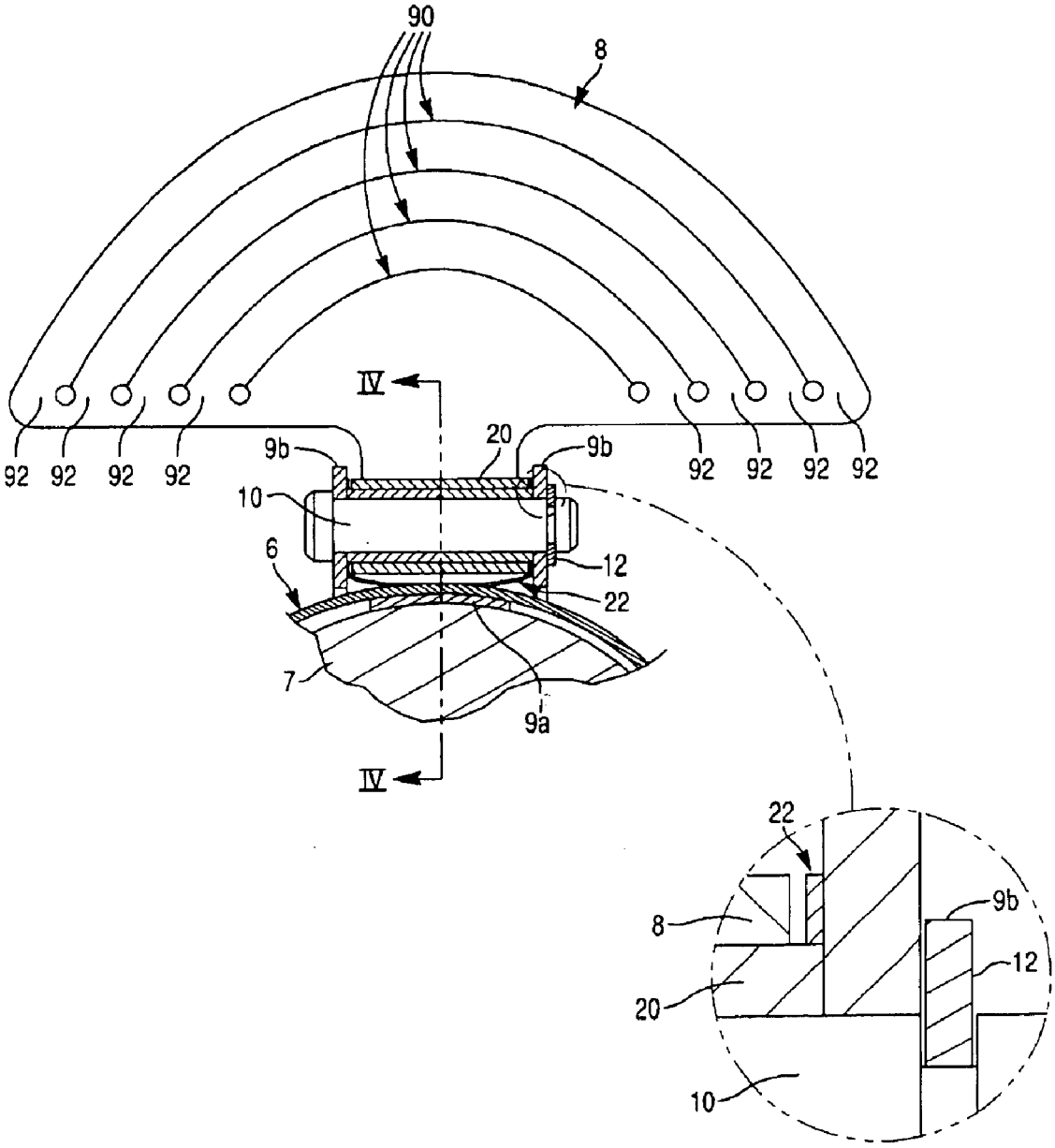
FIG. 3a is a partial enlarged view illustrating one of the blades, or dispensing elements, which is attached to the shaft in FIGS. 1–2.
FIG. 3b is a partial enlarged view of the retaining elements for the hub of the dispensing element.

With reference to FIGS. 3a and 3b, the vane holder and mounting structure will now be described. The vane holder 9 is a u-shaped member having a base portion through which the band 6 passes and support legs 9b formed with an aperture. A spring insert 22 in the form of a u-shaped resilient member is disposed between the two support legs 9b. The spring insert 22 is also formed with a pair of apertures that align with the apertures of the support legs 9b. The dispensing blade 8 is fitted onto a bearing sleeve 20, and the bearing sleeve 20 is aligned with the apertures of the support legs 9b. The support shaft 10 passes through one support leg 9b then through the spring insert 22 and the bearing sleeve 20, and then through the second support leg 9b. The shaft 10 is retained in place by a suitable fastener, preferably a retaining clip 12.

The spring insert 22 is designed to retain the vane holder 9 in place relative to the support band 6 via a friction-fit arrangement. With this arrangement, the vane holder 9 may be slid along the band 6 to a desired location where the holder 9 is retained in place using the friction-fit arrangement. Of course, other retention systems may be employed to selectively retain the vane holder 9 relative to the band 6.

Each blade 8 is free to pivot about the axis defined by the shaft 10 so that each blade 8 can pivot in either direction about the shaft 10 to which it is pivotally and movably attached. Because each blade 8 can pivot downward in either direction about 90° relative to its extended or "stand up" position (FIG. 3), the lubricant dispenser 4 may be inserted into chamber 11 through the opening defined by bore 32. This is advantageous in that a dispenser 4 may be inserted into chamber 11, with the operating outer diameter of dispenser 4 (defined by the outer diameter of blades 8) being greater than the diameter of the opening through which the dispenser is originally fed. Typically, dispenser 4 will be inserted into chamber 11 with the shaft and bearings through the annular opening defined by hole or bore 32 in the pump housing. Portion 34 is removable.

Figure 4:
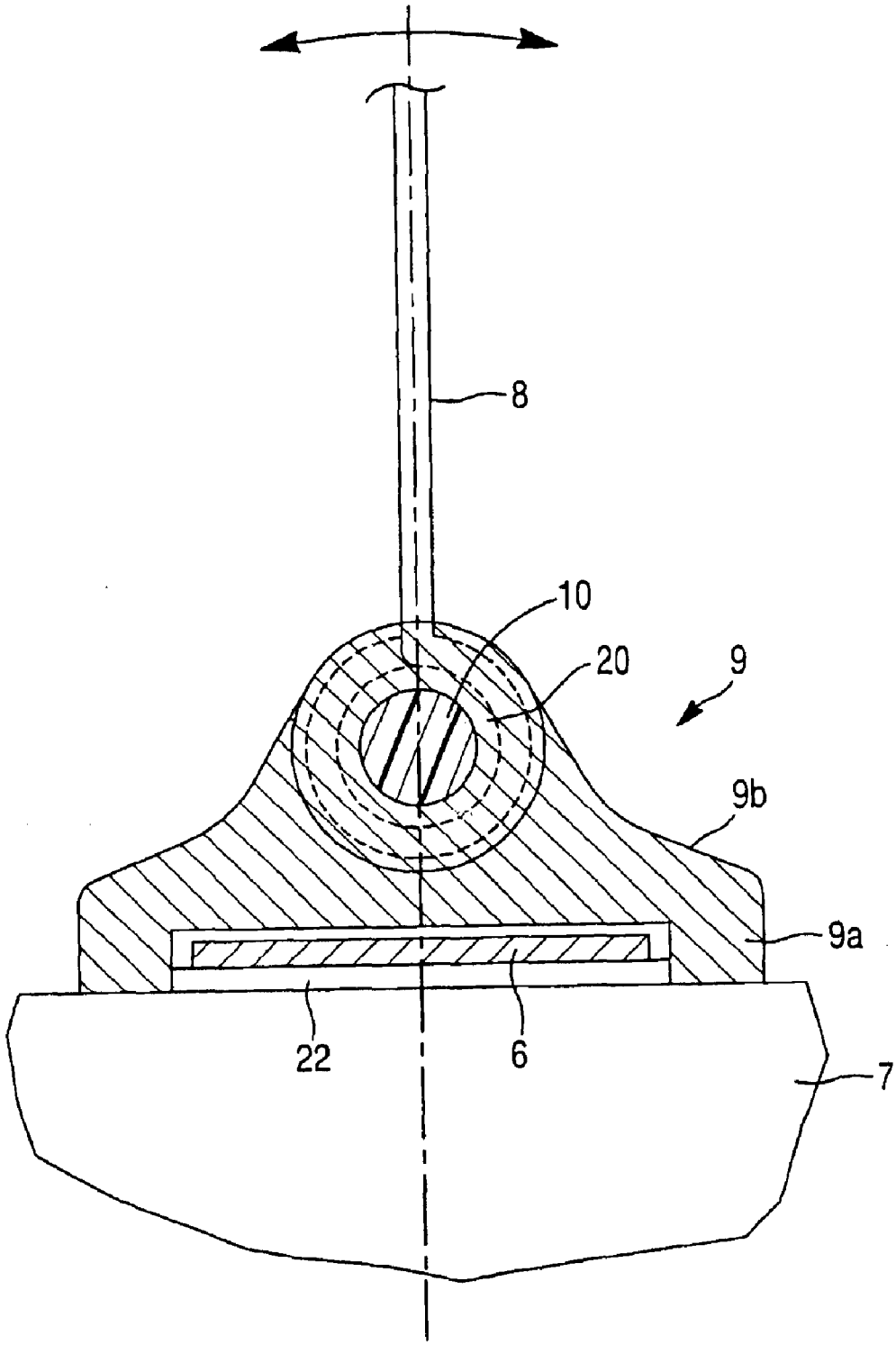
FIG. 4 is a sectional view taken along section line IV—IV of FIG. 3a showing the hub of the dispensing element including the vane holder, bearing member and shaft.

FIG. 4 is a sectional view taken along section line IV—IV of FIG. 3a showing the vane holder assembly of the dispensing element including the vane or blade 8, vane holder 9, bearing sleeve 20 and shaft 7. As shown in FIG. 4, the blade 8 is formed to wrap around the bearing sleeve 20.

The blade(s) 8 in its operating position is caused to extend radially away from the center of shaft 7 due to the centrifugal force created by rotation of the shaft. In other words, each dispensing member or blade 8 is in the position of FIG. 4 when pump shaft 7 is caused to rotate during operation by the pump motor. However, as discussed above, because each blade 8 is pivotally mounted to holder 9, during non-rotation of shaft 7, the blades 8 on the upper side of the pump shaft flop or pivot downward about the axis defined by holder 9. As illustrated by the arrow in FIG. 4, each blade 8 may pivot about the axis defined by shaft 10 about 90° in either direction from its illustrated operating position.

Also illustrate in FIG. 2 are the two ends 70 of band 6. Each end 70 are adapted to receive a fastener 73, such as a locking fastener, bolt and corresponding nut or other retainer, for the purpose of securing band 6 around the external periphery of shaft 7. In such a manner, support band 6 is wrapped around the outside of shaft 7, with the two ends 70 of band 6 being secured to one another by way of fastener 73. A corresponding nut may be provided on the end of fastener 73 for the purpose of maintaining support band 6 in a secured position affixed around the pump shaft for rotation therewith.

It is also important to note, relative to FIGS. 1–5, that during operation, the distal, or radially most outward, edge 80 of blades 8 is curved or arc-shaped. The curves of the edge 80 of blades 8 are formed so that, as shown in FIG. 2, if the blades were connected, the center of the resulting circle would be outside the center of shaft 7. Also, it is edges 80 of blades 8 which slice into the lubricating fluid (below level 19) during rotation of shaft 7 thereby flinging or dispensing the fluid 13 throughout chamber 11 so as to lubricate the adjacent ball bearings. Due to the shape of the edges 80, an intermediate portion 82 engages the lubricating fluid before the terminal ends 84, 85 of each blade 8. It has been found that the prior art blade configuration causes the leading edge to strike the lubrication fluid during operation, and this prior art arrangement causes undesirable splashing or spraying of lubricating fluid. Because the blades 8 of this invention are designed to strike the lubricating fluid at an intermediate portion 82 and not the leading edge, the undesirable splashing or spraying is substantially reduced or eliminated.

Figure 5C:
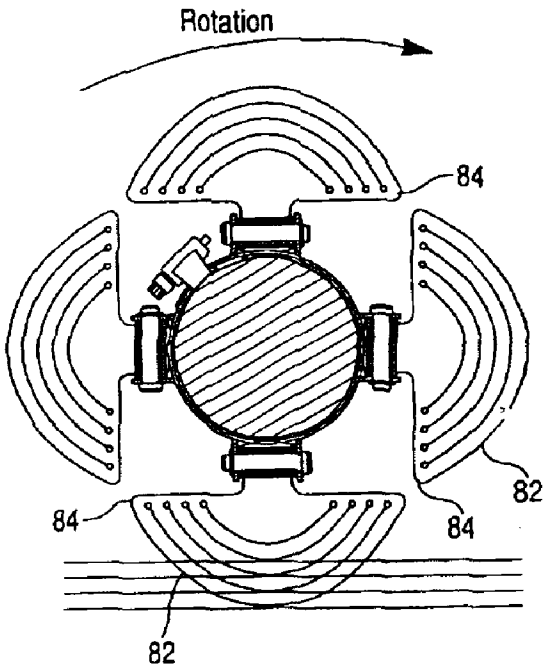
FIGS. 5a–5c are a series of schematic views illustrating how the dispensing system of the invention functions to reduce or eliminate splashing or spraying of the oil.
Figure 5B:
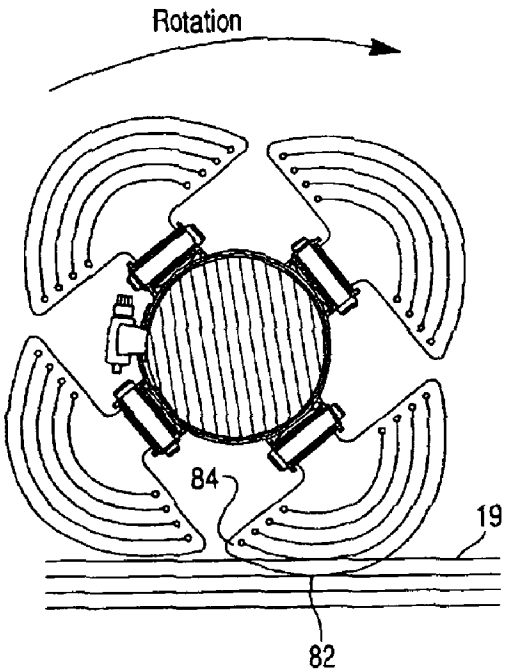
Figure 5A:
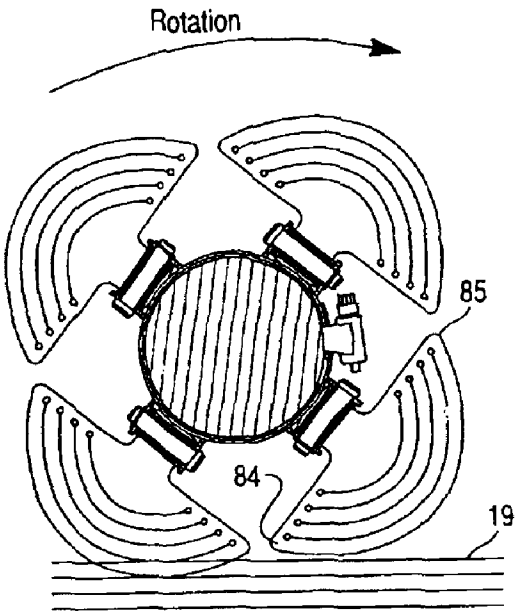

FIGS. 5a–5c are a series of schematic views illustrating how the dispensing system of the invention functions to reduce or eliminate splashing or spraying of the oil. As illustrated in FIGS. 5a–5c, the intermediate portion 82 of the edges 80 slices into the lubricating oil at the fluid level 19 before the leading edge 84; therefore, the collapsible dispensing members are designed with a profile oil-engaging edge that reduces splashing or spraying of the oil. In one design, the leading edge 84 does not reach the fluid level 19; however, this fact is dependent on the oil level itself.

Figure 6:
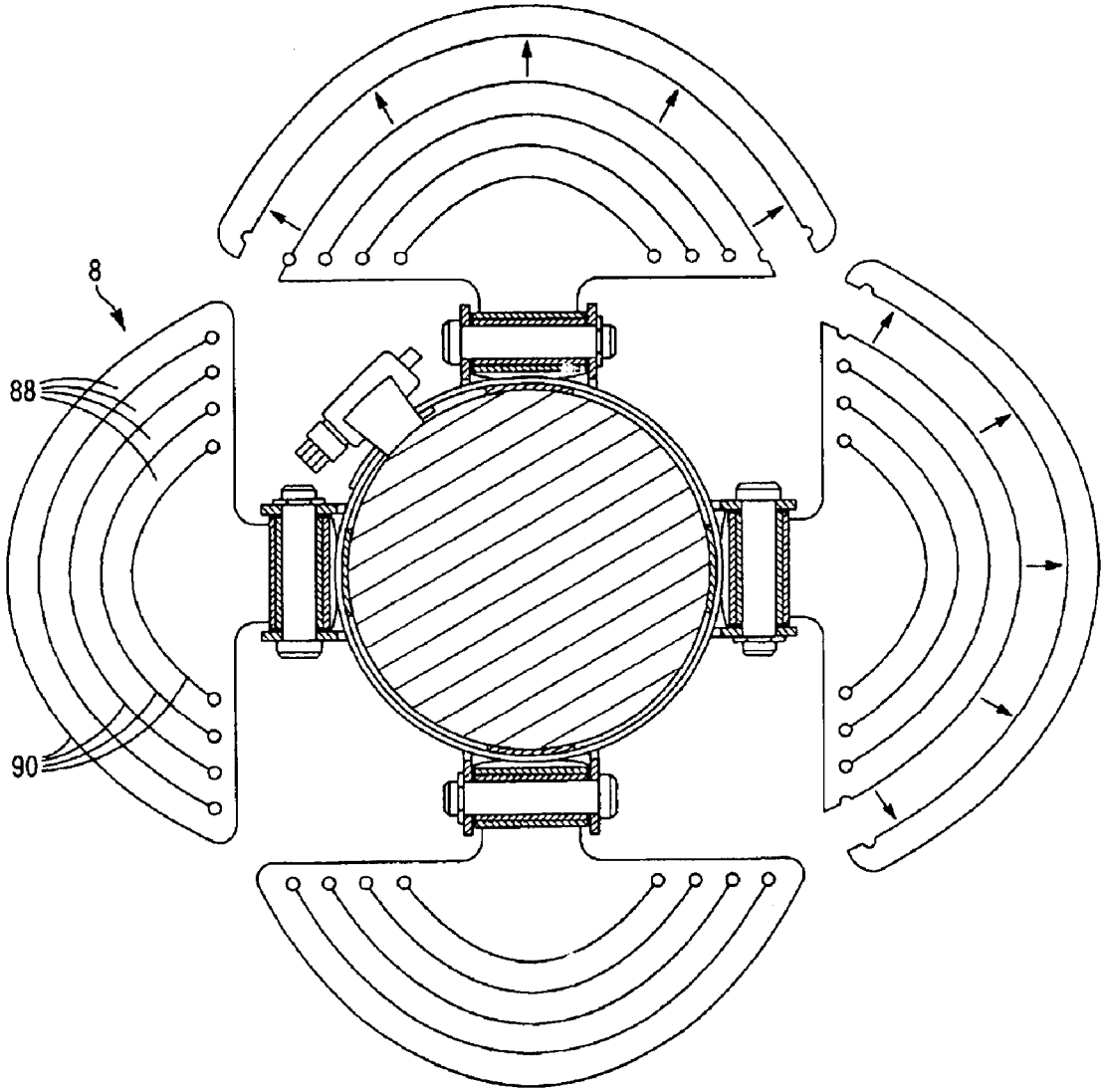
FIG. 6 is a side cross-sectional view of the oil misting chamber of a centrifugal chemical processing pump according to another embodiment of this invention, this dispensing blades being selectively segmented to reduce the blade size to allow a single blade design to be used in different bearing frames.

FIG. 6 is a side cross-sectional view of the oil misting system for a centrifugal chemical processing pump according to another embodiment of this invention, this dispensing blades being selectively segmented to reduce the blade size to allow a single blade design to be used in different bearing frames. More specifically, the blades 8 may be designed with fracture lines 90 permitting a selective reduction of the blade size. An operator can change the size of the blade 8 by cutting the ends 92 of the blades 8 to separate one of the segments 88 from the main body of the blade as shown in FIG. 6. The specific number of segments and the manner by which these segments are attached/detached may be varied without departing from the purpose and advantage of this invention.

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A centrifugal pump for pumping a liquid to be pumped, the pump comprising:

a pump housing;

a rotatable shaft disposed at least partially within said housing, said shaft defining a rotational axis;

a lubrication chamber surrounding said shaft, said chamber for housing a lubricating fluid;

shaft support bearings disposed in or adjacent said lubrication chamber, said bearings to be lubricated by the lubricating fluid;

a dispenser including a base support member and a plurality of collapsible dispensing members pivotally attached thereto, said dispenser being attached to said shaft for rotation therewith and for dispensing the lubricating fluid in said chamber in order to lubricate said bearings;

wherein said collapsible dispensing members are pivotally attached to said support member so that said dispensing members can collapse axially along said shaft when said shaft is not rotating thereby enabling said dispenser to be more easily inserted into said chamber during the manufacture of said pump or during maintenance being performed thereon; and wherein said dispensing members include an [arcuate] *oil-engaging* edge oriented to engage said lubricating fluid at a dispensing location between opposite terminal ends of said [arcuate] *oil-engaging* edge.

2. The centrifugal pump of claim 1, wherein said [arcuate] *oil-engaging* edge of said dispensing members is disposed on each said dispensing members.

3. The centrifugal pump of claim 1, wherein said [arcuate] *oil-engaging* edge has a radius of curvature that is less than a distance from said leading edge to said rotational axis.

4. The centrifugal pump of claim 1, wherein said [arcuate] *oil-engaging* edge is further from said rotational axis than said terminal ends.

5. The centrifugal pump of claim 1, wherein said dispensing members are pivotally attached to said dispenser so that centrifugal force created by rotation of said shaft during operation of the pump causes said dispensing members to extend radially relative to said shaft during pump operation thereby enabling said dispensing members to dispense the lubricating fluid in said chamber.

6. The centrifugal pump of claim 2, wherein said dispenser further includes an elongated band member encircling said shaft.

7. The centrifugal pump of claim 6, further comprising an insert spring providing a friction-fit engagement of said support member with respect to said band member.

8. The centrifugal pump of claim 6, wherein said band member passes through said support member.

9. The centrifugal pump of claim 7, wherein a support shaft passes through said support member, said insert spring, and said dispensing members.

10. The centrifugal pump of claim 1, wherein said support member includes a plurality of projections which extend radially away or outward from said shaft, said projections receiving a support shaft, wherein said collapsible members are pivotally attached to said support shaft.

11. A method of inserting a lubricant dispenser into a misting chamber of a pump, the method comprising the steps of:

providing a pump including a misting chamber therein, said pump including a bore adjacent said misting chamber through which the lubricant dispenser is to be inserted along with a shaft;

providing a lubricant dispenser having a plurality of collapsible or bendable dispensing members pivotally attached around the outer periphery thereof to disperse a lubricating fluid;

collapsing or bending said dispensing members prior to insertion of said dispenser into said chamber;

inserting said dispenser with collapsed dispensing members through said bore and into said misting chamber along with said shaft;

orienting said dispensing members such that an [arcuate] *oil-engaging* edge is oriented to engage said lubricating fluid at a location between opposite terminal ends of said [arcuate] *oil-engaging* edge; and operating said pump so that centrifugal force created by rotation of a pump shaft to which said dispenser is attached causes said dispensing members to extend radially outward from said shaft in order to dispense lubricant throughout said misting chamber.

12. The method of claim 11, wherein said at least one of said dispensing members comprises a plurality of breakable or separable tabs defining different outer radial edges.

13. A pump comprising:

a rotatable pump shaft adapted to be rotated in order to drive a fluid pumping impeller so as to pump a fluid to be pumped;

a misting chamber surrounding said shaft;

bearings located within or adjacent said misting chamber, said bearings to be lubricated by lubricant within said misting chamber;

a lubricant dispenser affixed to said shaft for rotation therewith and located within said misting chamber, said lubricant dispenser for dispensing lubricant in said misting chamber in order to lubricate said bearings;

wherein said lubricant dispenser includes a plurality of collapsible or bendable lubricant dispensing members attached thereto, said dispensing members for extending radially relative to said shaft when said shaft is rotated thereby dispensing lubricant in said chamber in order to lubricate said bearings; and wherein at least one of said dispensing members comprises [a] *an* outer radial edge having a selectively adjustable radial length *whereby said at least one of said dispensing members comprises a plurality of breakable or separable tabs defining different outer radial edges.*

[14. The pump of claim 13, wherein said at least one of said dispensing members comprises a plurality of breakable or separable tabs defining different outer radial edges.]

15. A centrifugal pump having an adjustable bearing frame lubrication system for use in a lubrication chamber of the pump, the pump comprising:

said lubrication chamber located proximate bearings to be lubricated by lubricant in said chamber;

said bearings including at least one stationary annular bearing frame having an inner diameter defined by the inner periphery of said bearing frame;

an adjustable lubricant dispenser adapted to be attached to a pump shaft in said chamber for rotation therewith, said dispenser having a first outer diameter defined when said dispenser is in a first state for use during insertion of said dispenser through a bore and into said chamber, and a second diameter defined when said dispenser is in its second or operating state; and a mounting assembly mounting said dispenser on said pump shaft, said mounting assembly comprising at least one u-shaped vane holder and at least one support shaft,

*a band member circumscribing said pump shaft, said band member passing through said vane holder,* wherein said support shaft passes through said vane holder and said dispenser to define a pivot axis along an axis of said support shaft.

[16. The centrifugal pump according to claim 15, further comprising a band member circumscribing said pump shaft, said band member passing through said vane holder.]

17. The centrifugal pump according to claim [16]*15*, further comprising an insert spring creating a friction fit between said vane holder and said band member.

*18. The centrifugal pump of claim 1, wherein said oil-engaging edge is arcuate.*

*19. The centrifugal pump of claim 1, wherein said oil-engaging edge is curved.*

*20. The method of claim 11, wherein said oil-engaging edge is arcuate.*

*21. The method of claim 11, wherein said oil-engaging edge is curved.*

* * * * *